United States Patent
Armando et al.

(10) Patent No.: US 8,104,310 B2
(45) Date of Patent: Jan. 31, 2012

(54) ASSEMBLY FOR OPENING/CLOSING MOLDS OF A GLASSWARE MOLDING MACHINE

(75) Inventors: Lorenzo Armando, Cuneo (IT); Maurizio Barolo, Fossano (IT); Gianclaudio Borsarelli, Cuneo (IT); Marcello Ostorero, Vignolo (IT)

(73) Assignee: Bottero S.p.A., Cuneo (IT)

( * ) Notice: Subject to any disclaimer, the term of this patent is extended or adjusted under 35 U.S.C. 154(b) by 169 days.

(21) Appl. No.: 12/707,249

(22) Filed: Feb. 17, 2010

(65) Prior Publication Data

US 2011/0041559 A1 Feb. 24, 2011

(30) Foreign Application Priority Data

Feb. 18, 2009 (IT) ................. TO2009A0116

(51) Int. Cl.
*C03B 11/05* (2006.01)
*C03B 9/00* (2006.01)
(52) U.S. Cl. ................ 65/357; 65/214; 65/359; 65/360
(58) Field of Classification Search ............... 65/357, 65/360, 361, 214
See application file for complete search history.

(56) References Cited

U.S. PATENT DOCUMENTS

| | | | | |
|---|---|---|---|---|
| 3,460,931 A * | 8/1969 | Rowe | ................. | 65/313 |
| 4,009,018 A | 2/1977 | Nebelung et al. | ................. | 65/229 |
| 2008/0209951 A1 * | 9/2008 | Armando et al. | ................. | 65/359 |
| 2008/0282739 A1 * | 11/2008 | Cramer | ................. | 65/260 |
| 2010/0018256 A1 * | 1/2010 | Balbi et al. | ................. | 65/313 |

FOREIGN PATENT DOCUMENTS

| | | |
|---|---|---|
| EP | 0 059 576 A1 | 9/1982 |
| EP | 1278705 B1 | 11/2005 |
| EP | 1 964 815 A1 | 2/2008 |
| EP | 2145861 A1 | 1/2010 |
| WO | WO 02/46111 A1 | 6/2002 |

OTHER PUBLICATIONS

International Search Report dated Oct. 15, 2009 from IT TO20090116.
European Search Report dated Mar. 22, 2010 for corresponding European Application No. 10153749.6.

* cited by examiner

*Primary Examiner* — Matthew Daniels
*Assistant Examiner* — Lisa Herring
(74) *Attorney, Agent, or Firm* — Ohlandy, Greeley, Ruggiero & Perle, L.L.P.

(57) ABSTRACT

A mold of a glassware molding machine has two half-molds movable between a closed molding position and an open extraction position by a mold opening/closing assembly, wherein two actuating arms, each fitted to a respective half-mold, are rotated about respective fixed hinge axes by an actuator assembly having a central linear actuator, and two lateral linear actuators located substantially on opposite sides of the central actuator; the actuators having respective movable members translating respectively along a central axis and two lateral axes parallel to one another and to the fixed hinge axes; and the central axis being located at a distance from a plane of the lateral axes.

7 Claims, 5 Drawing Sheets

ASSEMBLY FOR OPENING/CLOSING MOLDS OF A GLASSWARE MOLDING MACHINE

BACKGROUND OF THE INVENTION

The present invention relates to an assembly for opening/closing molds of a glassware molding machine.

In glassware molding, molding machines, known as I.S. machines, are used, which comprise a number of side by side forming sections, each for producing a succession of products.

Each forming section comprises a rough mold normally comprising a row of side by side cavities, each for receiving a glass gob and forming a respective semifinished product. Each semifinished product is fed in a forming direction and transferred by an inverter to a finish mold, in which the semifinished product is processed further to obtain the desired finished product, which is then ejected from the mold and carried off.

The rough mold and finish mold each comprise two half-molds movable with respect to each other between a closed position and an open position.

The half-molds are moved between the open and closed positions by a mold opening/closing assembly comprising, for each mold, two actuating arms, which are fitted to respective half-molds and hinged to a fixed structure to rotate, under control of a mechanical transmission, in opposite directions about vertical axes. The transmission is operated by a single linear actuator, the translating output member of which moves back and forth in a direction perpendicular to the fixed vertical hinge axes.

Though widely used in conventional forming sections, known mold opening/closing assemblies of the above type are practically impossible to install on new-generation forming sections, mainly on account of their bulk in the forming direction. This is substantially due to the type of transmissions employed, and the location of the actuator, which must be located as close as possible to the molds to minimize inevitable slack in the linkage connecting the actuator to the arms.

The bulk of the opening/closing assembly in the forming direction also poses a wide range of problems when dismantling the assembly from the section, e.g. for routine overhauling or repair, which also involves removing other parts of the section.

Some of the above problems have been partly solved using actuators with vertical translating output members, and dedicated mechanical transmissions.

Mold opening/closing assemblies of this sort, however, have other drawbacks of their own, and more specifically a large number of moving parts. The inevitable friction involved seriously, and at times unpredictably, affects the movement of the half-molds, particularly the dead centre positions, thus resulting in a mold opening/closing assembly that is difficult to control—by failing to ensure correct proportion and timing between the thrust exerted by the actuator and the movement of the arms—and in the production of substandard glass articles in terms of shape and quality.

SUMMARY OF THE INVENTION

It is an object of the present invention to provide a mold opening/closing assembly designed to provide a straightforward, low-cost solution to the above problems.

According to the present invention, there is provided an assembly for opening/closing a glassware molding machine mold comprising two half-molds movable with respect to each other; the assembly comprising a supporting structure; two actuating arms hinged to said supporting structure to rotate about respective parallel, substantially vertical, fixed hinge axes, and each fitted to a respective half-mold; and drive means for rotating said actuating arms about the respective said fixed hinge axes, and moving said half-molds between an open position and a closed position; said drive means comprising actuating means, and a mechanical transmission interposed between said actuating arms and said actuating means; and the assembly being characterized in that said actuating means comprise a central linear actuator, and two lateral linear actuators located substantially on opposite sides of said central actuator; said actuators having respective movable members translating respectively along a central axis and two lateral axes parallel to one another and to said fixed hinge axes; the central axis being located at a distance from a plane of the lateral axes; and said mechanical transmission comprising an input member translating along said central axis.

In the assembly described above, said central axis preferably extends between said plane of the lateral axes and a plane of said fixed hinge axes.

For each said actuating arm, the transmission preferably comprises a crank connected to the input member to rotate in axially-fixed manner about said central axis.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
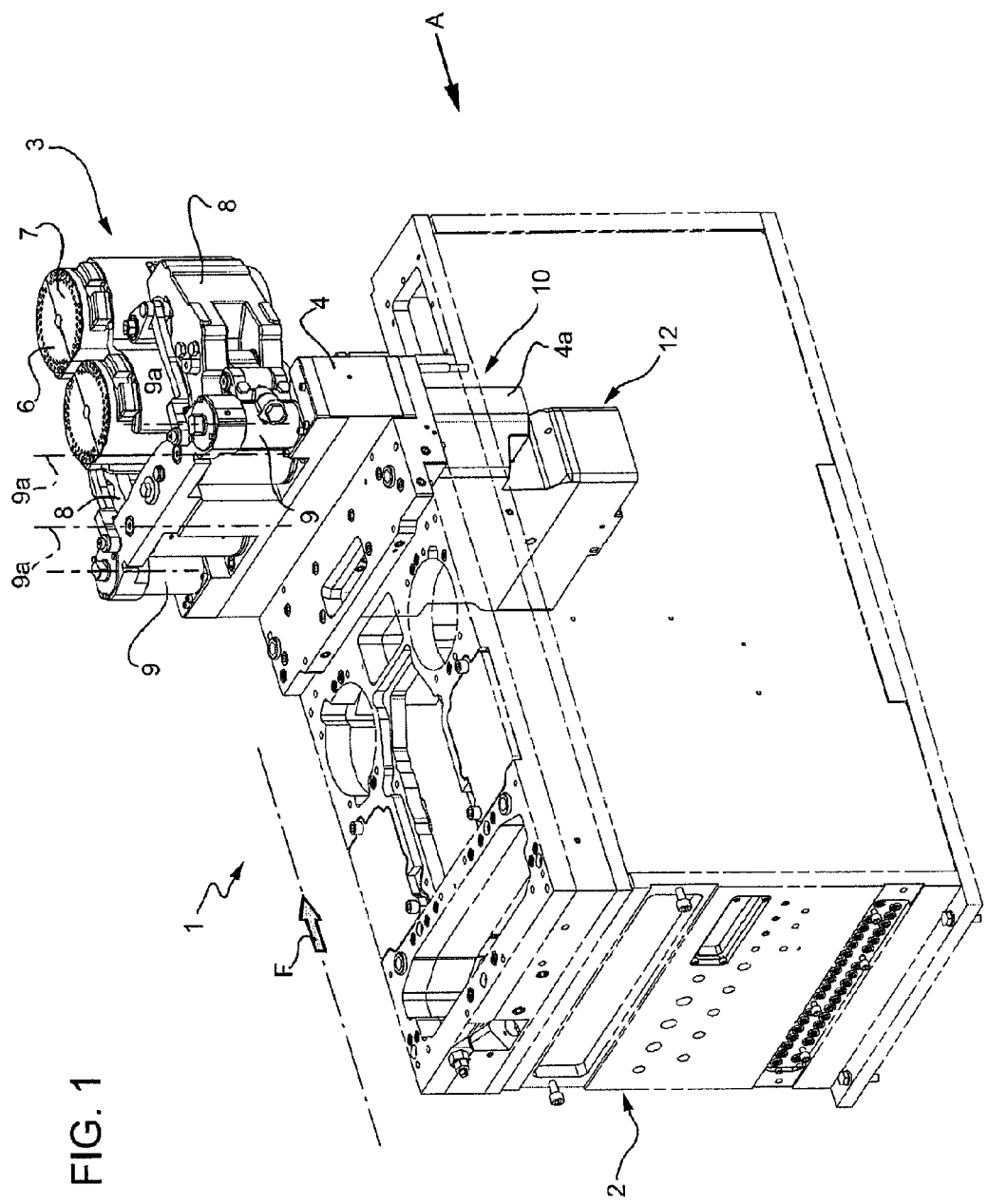
FIG. 1 shows a view in perspective of a portion of a forming section with a mold operated by a mold opening/closing assembly in accordance with the teachings of the present invention.
Figure 2:
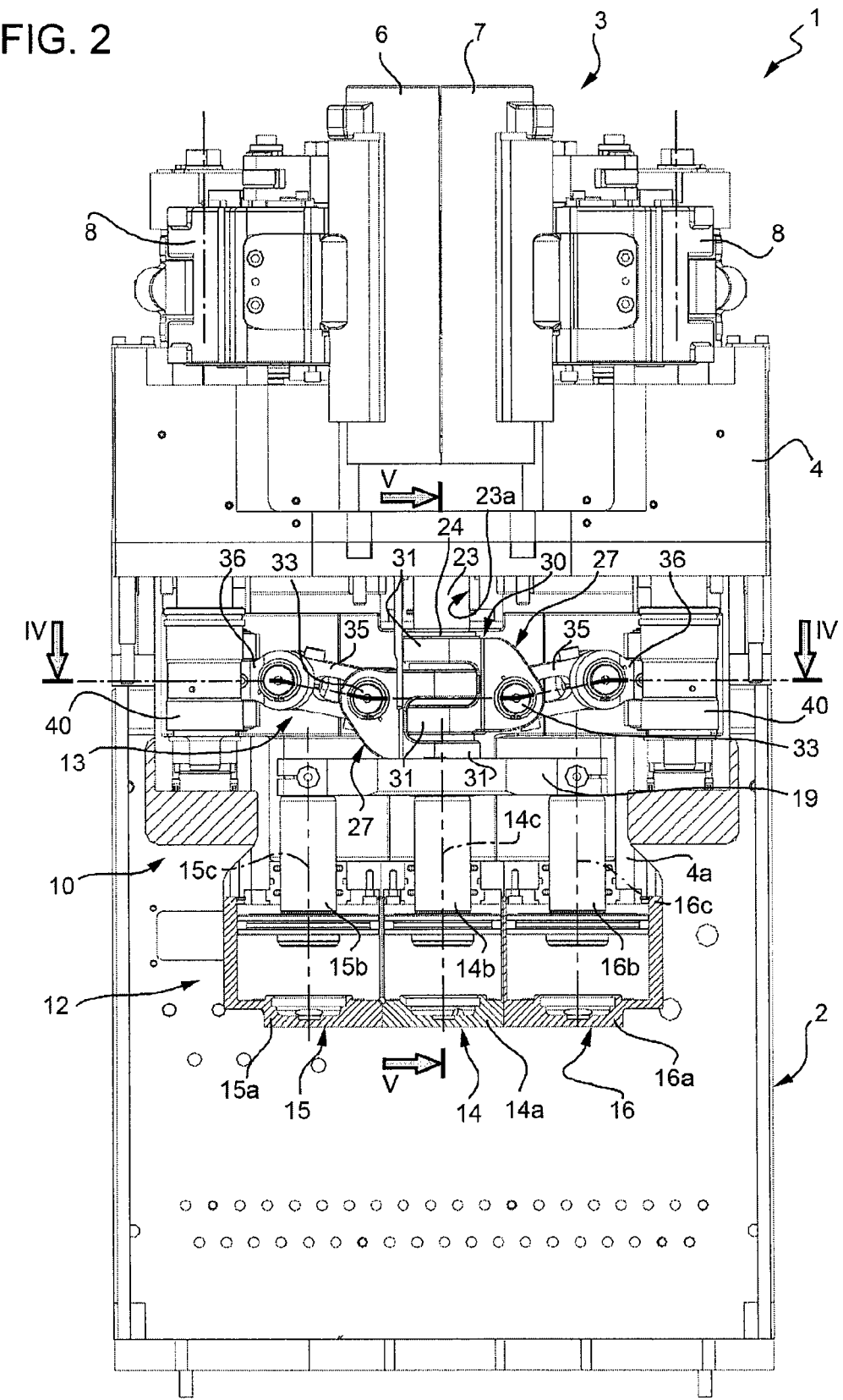
FIGS. 2 and 3 show views, in the direction of arrow A in FIG. 1 and with parts removed for clarity, of the mold and the opening/closing assembly in two different operating positions.
Figure 3:
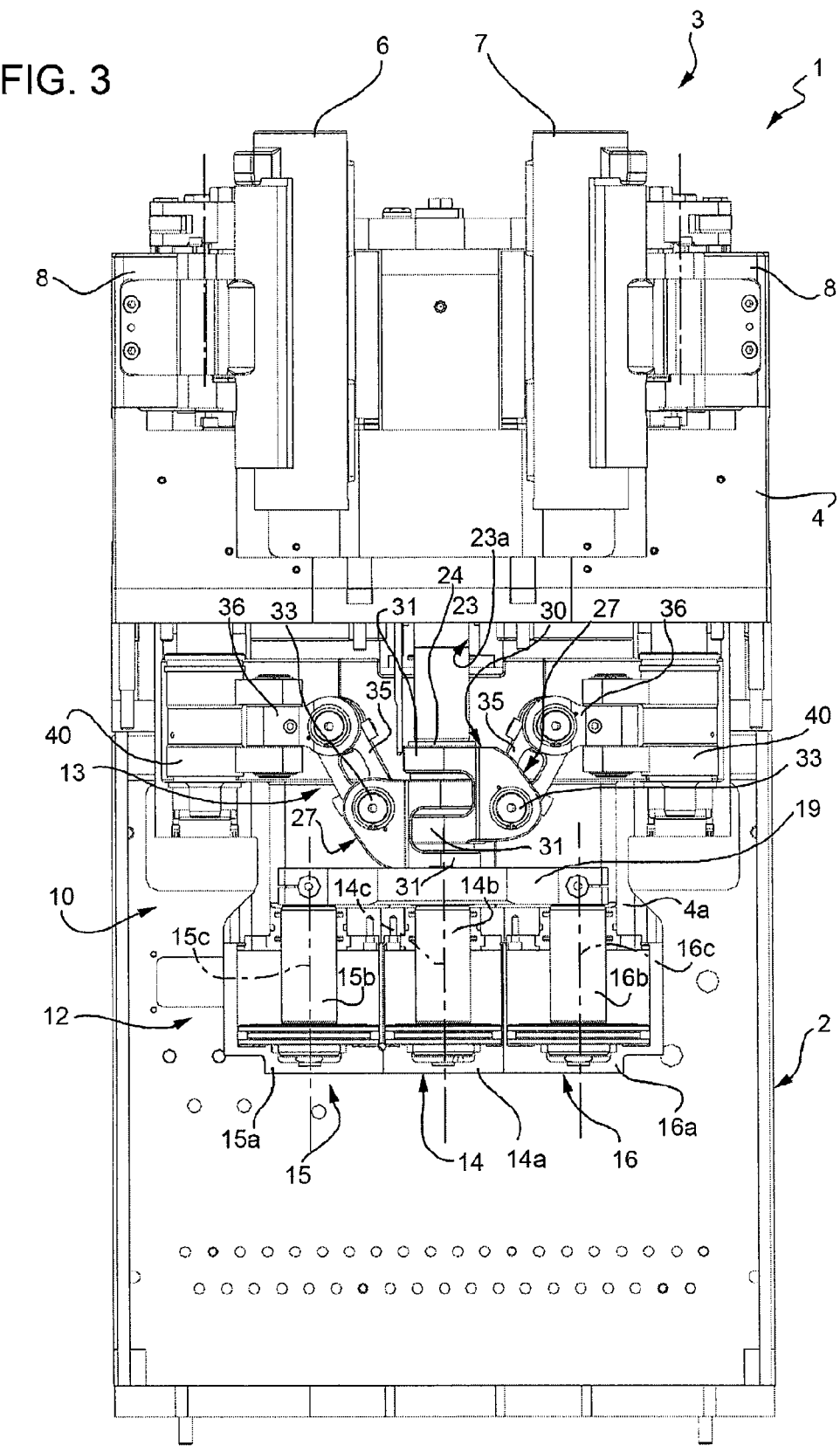

Number 1 in FIGS. 1 to 3 indicates as a whole a forming section of a so-called I.S. machine for producing hollow glass articles (not shown).

Forming section 1 comprises a hollow bottom supporting structure 2 (only shown partly); and a mold assembly 3, in turn comprising a mounting and supporting frame 4 connected releasably and in a fixed position to hollow structure 2, and two half-molds 6, 7.

Each half-mold 6, 7 is connected to frame 4 by an arm 8, which is fitted in known manner to relative half-mold 6, 7 at one end, and at the other end is hinged to frame 4 and rotated back and forth about a fixed hinge axis 9a by a respective rotary torsion shaft 9 fitted in known manner to arm 8 and extending parallel to and eccentrically with respect to the respective hinge axis (FIG. 1).

A mold opening/closing assembly 10 rotates arms 8, with respect to frame 4 and back and forth about respective fixed hinge axes 9a, between two angular limit positions: a closed position, in which half-molds 6, 7 define between them a cavity in which to mold the article (FIGS. 1, 2, 4); and an open position, in which half-molds 6, 7 are opened to eject the article (FIG. 3).

With reference to FIGS. 2 and 3, assembly 10 extends at least partly inside hollow structure 2, is removable from hollow structure 2 by simply sliding it out vertically, i.e. parallel to axes 9a, and comprises an actuator assembly 12, and a mechanical transmission 13 interposed between actuator assembly 12 and torsion shafts 9, which form part of assembly 10.

Figure 4:
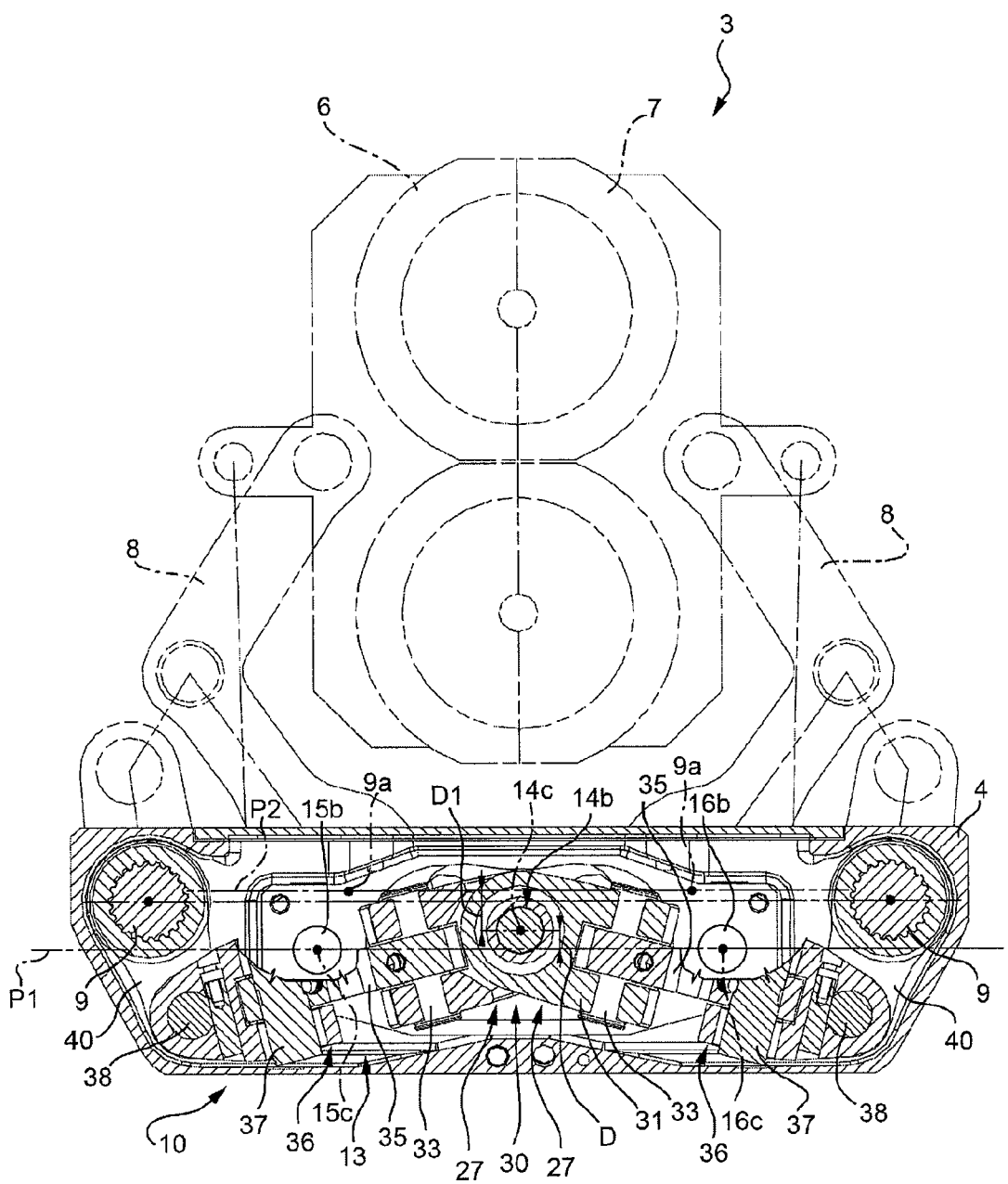
FIG. 4 shows a section along line IV-IV in FIG. 2.

Actuator assembly 12 comprises three separate air-powered linear actuators 14, 15, 16, of which actuator is a central actuator, and actuators 15 and 16 are lateral actuators located practically on opposite sides of central actuator 14. As explained in detail below, actuator 14 is located further forward, in a forming direction F (FIG. 1), than lateral actuators 15 and 16. Actuators 14, 15, 16 have respective outer casings 14a, 15a, 16a connected firmly to a bottom portion 4a of frame 4; and respective axially-sliding output rods 14b, 15b, 16b, which slide back and forth, respectively, along a central axis 14c and two lateral axes 15c, 16c parallel to one another and to fixed hinge axes 9a. As shown in FIG. 4, central axis 14c is located at a distance D from a plane P1 containing lateral axes 15c and 16c, and extends between plane P1 and a plane P2 containing fixed hinge axes 9a. More specifically, central axis 14c is located at a distance D1 from plane P2 of fixed hinge axes 9a greater than distance D; and the plane of the rotation axes of torsion shafts 9 extends parallel to and between planes P1 and P2, and is adjacent to plane P2.

Figure 5:
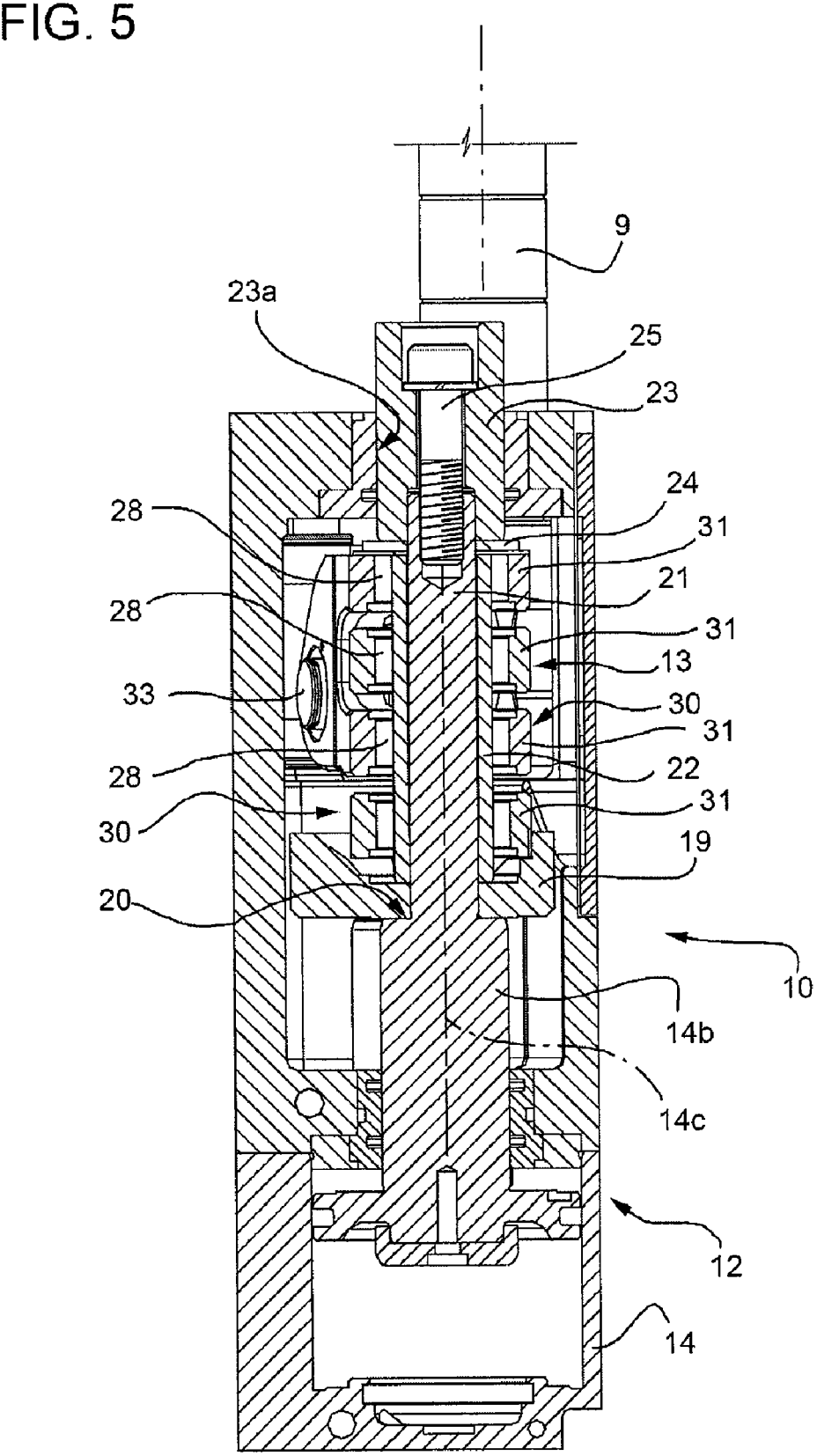
FIG. 5 shows a section, with parts removed for clarity, along line V-V in FIG. 2.

With reference to FIGS. 2, 3 and 5, the top ends of rods 15b and 16b are connected firmly to a common plate 19 perpendicular to axes 9a, 14c, 15c and 16c; and rod 14b has an annular shoulder 20 contacting the underside surface of plate 19, and terminates with a smaller-diameter portion 21 projecting upwards through plate 19. With reference to FIG. 5, central rod 14b is connected firmly to plate 19 by two sleeves 22, 23 separated by an intermediate plate 24 and tightened to plate 19 by an axial screw 25. Sleeve 23 engages a guide 23a in axially-sliding manner, to keep rod 14b as a whole coaxial with axis 14c at all times, regardless of operating conditions, i.e. regardless of any loads generated by half-molds 6, 7 or transmission 13.

Plates 19 and 24, portion 21, and sleeves 22 and 23 form the input member of transmission 13, which, as shown in FIGS. 2, 3 and 4, also comprises two opposed cranks 27—one for each torsion shaft 9—connected to sleeve 22 to rotate in axially-fixed manner about central axis 14c on respective bearings 28. More specifically, each crank 27 comprises a connecting portion 30 in turn comprising two fork-like arms 31 interlaced axially with arms 31 of connecting portion 30 of the other crank 27, and locked axially by plate 24 on one side, and plate 19 on the other side. Each crank 27 is hinged, by a respective pin 33 perpendicular to central axis 14c, to one end of a respective crank 35, the opposite end of which is hinged to a further crank 36 by a pin 37 parallel to pin 33. Each crank 36 is in turn hinged, by a respective pin 38 perpendicular to relative pin 37, to a crank 40 fitted to relative torsion shaft 9.

The "vertical" arrangement of actuators 14, 15, 16 clearly provides, above all, for reducing the bulk of mold opening/closing assembly 10 in molding direction F, and so achieving a highly compact assembly, the whole of which can be inserted and removed vertically, without having to completely or partly remove any other machine parts or mechanisms.

Vertical insertion/removal of mold opening/closing assembly 10 as a whole is made possible by the arrangement of actuator assembly 12, and also by the design of transmission 13, and in particular by employing one pair of connecting rod-crank assemblies for each torsion shaft 9.

From the operating standpoint, tests show that, by exerting opening/closing thrust at three separate points—one of which central and closer to plane P2 of the fixed hinge axes—the total thrust of actuators 14, 15, 16 can be directed in one direction perfectly parallel at all times to fixed hinge axes 9a, with no forces crosswise to output rods 14b, 15b, 16b of actuators 14, 15, 16. Compared to known solutions, using cranks 27 hinged to the extension of output rod 14b of central actuator 14 provides for drastically reducing friction components, and so preventing jamming or jerking, particularly at or close to the dead centre positions in the rotation of torsion shafts 9 and the half-molds, thus increasing response time. In other words, compared to known solutions, assembly 10 described definitely ensures correct proportion and timing between the thrust exerted by actuators 14, 15, 16 and the movement of half-molds 6, 7, regardless of operating conditions.

Clearly, changes may be made to assembly 10 as described herein without, however, departing from the protective scope as defined in the independent Claims.

The invention claimed is:

1. An assembly for opening/closing a glassware molding machine mold comprising two half-molds movable with respect to each other; the assembly comprising a supporting structure; two actuating arms hinged to said supporting structure to rotate about respective parallel, substantially vertical, fixed hinge axes, and each fitted to a respective half-mold; and drive means for rotating said actuating arms about the respective said fixed hinge axes, and moving said half-molds between an open position and a closed position; said drive means comprising actuating means, and a mechanical transmission interposed between said actuating arms and said actuating means; and the assembly being characterized in that said actuating means comprise a central linear actuator, and two lateral linear actuators located substantially on opposite sides of said central actuator; said actuators having respective movable members translating respectively along a central axis and two lateral axes parallel to one another and to said fixed hinge axes; the central axis being located at a distance from a plane of the lateral axes; and said mechanical transmission comprising an input member translating along said central axis.

2. An assembly as claimed in claim 1, characterized in that said central axis extends between said plane of the lateral axes and a plane of said fixed hinge axes.

3. An assembly as claimed in claim 1, characterized in that, for each said actuating arm, said transmission comprises a respective crank connected to said input member to rotate in axially-fixed manner about said central axis.

4. An assembly as claimed in claim 3, characterized in that said input member comprises a connecting plate, to which the movable members of said linear actuators are connected; and a shaft coaxial with said central axis, and to which respective connecting portions of said cranks are connected.

5. An assembly as claimed in claim 4, characterized in that said shaft coaxial with said central axis, and said movable member of said central actuator form part of a one-piece member extending through said connecting plate.

6. An assembly as claimed in claim 4, characterized in that each said connecting portion has a respective pair of fork-like arms interlaced axially with the arms of the other connecting portion.

7. An assembly as claimed in claim 3, characterized in that, for each actuating arm, said transmission also comprises a connecting rod-crank transmission; and a connecting rod interposed between the relative connecting rod-crank transmission and a respective said crank.

* * * * *